United States Patent [19]

Burke et al.

[11] Patent Number: 5,782,962
[45] Date of Patent: Jul. 21, 1998

[54] CLEANING AND POLISHING COMPOSITION

[75] Inventors: Peter A. Burke, Downingtown, Pa.; Kenneth J. Flanagan, Lakeland, Tenn.; Abul Mansur, Douglassville, Pa.

[73] Assignee: Sara Lee Corporation, Douglassville, Pa.

[21] Appl. No.: 730,947

[22] Filed: Oct. 16, 1996

[51] Int. Cl.$^6$ .................. C09G 3/18; C09G 1/02; C09G 1/06; C09G 1/12
[52] U.S. Cl. .................. 106/2; 106/3; 106/10; 106/11; 106/271; 106/272; 106/287.11; 106/287.14; 106/287.28; 524/261
[58] Field of Search .............. 106/2, 3, 287.11, 106/287.14, 10, 11, 287.28, 271, 272; 524/261

[56] References Cited

U.S. PATENT DOCUMENTS

| | | | |
|---|---|---|---|
| 4,218,250 | 8/1980 | Kasprzak | 106/3 |
| 4,354,871 | 10/1982 | Sutton | 106/11 |
| 4,846,887 | 7/1989 | Kuehnle | 106/270 |
| 5,017,222 | 5/1991 | Cifuentes et al. | 106/3 |
| 5,045,584 | 9/1991 | Sasaki et al. | 106/10 |
| 5,154,759 | 10/1992 | Cifuentes et al. | 106/11 |
| 5,174,813 | 12/1992 | Cifuentes et al. | 106/10 |
| 5,258,063 | 11/1993 | Cifuentes et al. | 106/10 |
| 5,300,327 | 4/1994 | Stark-Kasley et al. | 106/10 |
| 5,326,387 | 7/1994 | Faber et al. | 106/3 |
| 5,397,384 | 3/1995 | Wisniewski | 106/11 |
| 5,462,587 | 10/1995 | Greenleaf et al. | 106/271 |
| 5,503,755 | 4/1996 | Danner | 106/2 |
| 5,605,957 | 2/1997 | Yoshida | 524/731 |

FOREIGN PATENT DOCUMENTS

| | | | |
|---|---|---|---|
| 371452 | 6/1990 | European Pat. Off. | 106/3 |
| 551935 | 7/1993 | European Pat. Off. | 106/271 |
| 62-132981 | 6/1987 | Japan | 106/271 |
| 63-297490 | 12/1988 | Japan | 106/2 |
| 01-207369 | 8/1989 | Japan | 106/3 |

OTHER PUBLICATIONS

Chemical Abstract No. 123:231605 which is an abstract of European Patent Specification No. 655.483 (May 1995).
WPIDS Abstract No. 93-164725 which is an abstract of Japanese Patent Specification No. 05-098213 (Apr. 1993).

*Primary Examiner*—Anthony Green
*Attorney, Agent, or Firm*—John Lezdey

[57] ABSTRACT

A surface protective composition especially for use on automobiles is prepared which contains about 0.1 to 5% of a film forming fluorine containing polymer, 0 to 10% of micronized wax, a hydrocarbon solvent, an organosilicone compound, a surfactant and water.

8 Claims, No Drawings

CLEANING AND POLISHING COMPOSITION

BACKGROUND OF THE INVENTION

1. Field of the Invention

This invention relates to a liquid surface protectant composition used to impart a durable high gloss finish, and water repellency, to various surfaces such as painted automobile surfaces, thermoset and thermoplastic polymers, rubber and leather goods.

2. Descriptions of Prior Art

Surface protectant compositions such as polishes and waxes are used to prolong the useful life of the surface and preferably produce a glossy finish. For example, automobile and boat surface protectant compositions have traditionally involved the application of a wax composition. The wax component is one of the two film forming material in the polish. Blends of soft and hard wax are often employed in order to facilitate ease of buffing and improving the durability of the surface protectant compositions. Exemplary waxes are the paraffin wax, carnauba wax, microcrystalline wax, and synthetic polymer waxes such as oxidized polyethylene. See, for example, U.S. Pat. No. 4,846,887.

A wide variety of products which formulate with these hydrocarbons or vegetable-based waxes may include various additions such as solvents, silicone polymers, emulsifiers, thickeners, stabilizers, etc. all of which components are commercially available.

Silicones are included in polishes as the other film forming ingredient. Such silicone materials also function as lubricants for easing application of the polish as well as its buffing, and act as release agents for dried abrasives. The silicone materials spread easily and provide a uniform high gloss and water repellency. Such materials typically are dimethysilicones, however, aminofunctional silicone products are more preferred. The aminofunctional products result in films having increased resistance to removal from the surface by detergents and the environmental factors such as air polluting agents and acid rain. These characteristics are believed to be the result of their ability to plate out a painted surface and to crosslink and to bond to that surface. The aminofunctional silicones are disclosed as ingredients in several polish formulations in U.S. Pat. Nos. 4,218,250, 4,898,614 and 5,326,387, which are herein incorporated by reference.

A polish composition may also contain abrasives for removing oxidized paint from painted motor vehicle surfaces, as well as, soil and old polish build-up.

Protective coatings which can be applied onto the rubber, thermoset and thermoplastic polymers or leather surfaces of motor vehicles are also known. Generally, these protective coatings require substantial buffing to achieve uniform gloss. Further, these coatings typically are not suitable for the painted surfaces of an automobile.

There exists a need for a surface protectant composition that can be easily applied to a variety of surfaces, is self leveling over the surface and provides a high gloss coating having an improved depth-of-gloss characteristic; having durability with ease of application.

SUMMARY OF THE INVENTION

The invention is directed to a durable high gloss surface protectant composition. The composition comprises in admixture: film forming fluorine containing polymers; crosslinkable silicone compounds organopolysiloxane copolymers, micronized waxes, hydrocarbon solvents, surfactants and water.

The surface protectant composition of this invention can be easily applied to a surface, such as, the painted surface of an automobile to impart a durable high gloss coating having improved gloss characteristics and excellent water protection.

The surface protectant composition of this invention may be produced in the forms conventionally available including solvent based polishes, water based emulsion polishes and paste wax polishes.

In a preferred aqueous emulsion embodiment, the surface protectant composition comprises in admixture by weight:

a) from about 10 to about 70 percent of a hydrocarbon solvent;

b) from 0 to about 10 percent of a micronized wax;

c) from about 1 to about 10 percent of a crosslinkable silicone compound;

d) from about 1 to about 20 percent of an organopolysiloxane compound;

e) from about 0.1 to about 5 percent of a film forming fluorine containing polymer;

f) from about 0.1 to about 1 percent of a nonionic surfactant or a mixture of nonionic and anionic surfactants; and g) water.

Optionally, the compositions of this invention may include as components thickening agents, abrasives, colorants, fragrances and other ingredients normally used in making polishes.

The present surface protectant composition can be easily and evenly applied. More importantly, in contrast to other well known types of polishes and protective coatings, the present protective coating imparts a durable high gloss coating having improved depth-of-gloss values and provides excellent water protection to the treated surface. Thus, the present invention also comprehends a method of imparting a glossy appearance and water repellency onto surfaces including, but not limited to painted metal, thermoplastic and thermoset polymers, leather, rubber, masonry, concrete, glass, ceramic, fiberglass, and wood surfaces. Because this invention is particularly useful on automobile painted surfaces, it will be described herein in this regard. Such description, however, is not intended to limit the scope of the invention.

The liquid or paste compositions of this invention can be provided in aerosol form.

It is, therefore, an object of this invention to provide a water coating composition for hard surfaces which also provides water protection and imparts to the surface an improved depth-of-gloss aesthetic appearance.

Another object of this invention is to provide stable emulsions to be applied to a transport vehicle to impart a water and oil repellant coating.

Yet another object of this invention is to provide the coating composition as an automobile surface protectant composition.

A further object of the present invention is to provide the automobile surface protectant composition in aerosol form.

A still further object of the present invention is to provide a liquid coating which can be easily applied and yet produce a high gloss with little or no buffing.

DETAILED DESCRIPTION OF THE PREFERRED EMBODIMENTS

According to the present invention, the surface protectant composition includes several immiscible liquids and several film forming solids which upon effective evaporation of the carrier solvents from a multi-layer film of the components on a substrate to impart a water and oil protectant coating on that treated substrate. The surface protectant formulation comprises in admixture at least one member selected from micronized wax, crosslinkable silicone compounds, organosiloxane compounds, a film forming fluorine containing polymer and suitable solvents which include water and conventional hydrocarbon solvents. Surfactants, thickening agents, abrasives, colorants (i.e., dyes and pigments) fragrances and other ingredients normally used in making polishes may be employed to obtain a homogeneous stable product of desired consistency.

The surface protectant of this invention may be solid in form, semisolid, presoftened or liquid. For example, the composition can be solvent based or an emulsion and in either case a liquid, semi-solid or solid. In an emulsion paste formulation the micronized wax formulation is about twenty-five weight percent, whereas, in a liquid emulsion the micronized wax component is about five weight percent.

In accordance with this invention the surface protectant compositions are preferably in the form of an emulsion and include an oil phase containing a solvent, an organosilicone film forming compound, an aminofunctional silicone compound, a film forming fluorine containing polymer, a surfactant and micronized wax. The water phase comprises water and may include abrasives, antifreeze compounds such as ethylene, propylene glycol and colorants. Water-in-oil emulsions are preferred, however, oil-in-water emulsions are also contemplated. The liquid surface protectant compositions of this invention when applied to a substrate are converted to a solid or dry film finish. These compositions provide the substrate with enhanced water and oil protection with improved gloss characteristics. That is, the depth-of-gloss values for the solid or dry film finish is higher than a corresponding finish not containing the film forming fluorine containing polymer required by this invention.

Liquid emulsion formulations not containing abrasives have the advantage of providing the high gloss characteristics imparted to various surfaces without a buffing step.

Depth-of-gloss is a light-reflectance property which relates to the ability of the polished surface to reflect light. A depth-of-gloss value would become relatively more aesthetically pleasing to the eye in the event that a major portion of incident light rays should pass through the protectant film or film layers and should be reflected off or absorbed by the actual substrate surface, e.g., the painted surface of an automobile. It is to be noted, however, that certain light-reflectance properties are dependant on such physical characteristics as film thickness.

The micronized waxes which can be employed in the surface protectant formulations are well known to those skilled in the art and will vary depending on the specific use intended for the formulation and the properties being sought. The micronized wax particles preferably have an average diameter of the order of magnitude of from about two to about five microns although sizes up to about thirty microns may be employed. Most preferably, the micronized wax particles have an average diameter of about three microns. Specific examples of suitable waxes include animal waxes such as beeswax, spermaceti, lanolin and shellac wax; vegetable waxes such as carnauba, candelilla, mineral waxes such as ceresin, montan, paraffin, microcrystalline and petroleum; and synthetic waxes such as Fischer-Tropsch waxes, ethylenic polymers, polyol ether-esters and chlorinated napthalenes. Suitable micronized wax particles are disclosed in U.S. Pat. No. 4,846,887 issued Jul. 11, 1989. The amount of wax employed in the present composition ranges from about 1.0 to about 30 weight percent and preferably about 25% for solid paste formulations from about 3 to about 9 weight percent for liquid emulsion formulations.

The protectant composition also includes a minor amount of a cross-linkable silicone fluid, preferably an aminofunctional polysiloxane, which aids in the oil and water repellency and detergent resistant performance of the composition. In addition, aminofunctional silicone fluids are thought to be useful in protectant compositions because it is believed that they attach to the anionic surfaces of, for example, an automobile and at the same time, when water vapor is present, they cross-link to provide a longer lasting gloss and a more durable protective film. Accordingly, the type and amount of aminofunctional silicone fluid useful in the present invention can be dictated by, among other things, the desired resulting properties of the protectant composition as well as its compatibility with the other ingredients. In particular, those aminofunctional silicone fluids that cloud the composition when incorporated with the other ingredients are not desired.

Preferably, the aminofunctional silicone fluids include, but are not limited to, those with the general formula:

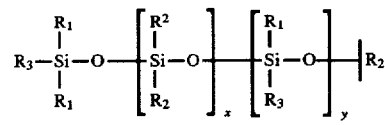

wherein x+y ranges from about 2 to 20, preferably wherein x ranges from 2 to 20 and y is 1. $R_1$ is an oxy radical, e.g. hydroxy, methoxy, ethoxy, and the like. Preferably, $R_1$ is selected from the group consisting of hydroxy, alkoxy, alkenoxy, phenyl, and mixtures thereof. More preferably, $R_1$ is selected from the group consisting of alkoxy having up to about 8 carbon atoms and mixtures thereof. In accordance with the most preferred embodiments, $R_1$ is selected from the group consisting of methoxy, ethoxy, and mixtures thereof.

$R_2$ may be an alkyl radical, e.g., methyl, ethyl, propyl, butyl, octyl, dodecyl, octadecyl, aryl radical, e.g., phenyl, diphenyl and naphthyl radical, alkenyl radical, e.g., vinyl and alkyl radical, cycloalkyl radical, e.g., cyclobutyl, cyclopentyl, and cyclohexyl, alkaryl radical, e.g., tolyl, xylyl, ethylphenyl, aralkyl radical, e.g., alpha-phenylethyl, beta-phenylethyl and alpha-phenylbutyl and the like. Preferably, $R_2$ is selected from the group consisting of alkyl, aryl, and mixtures thereof. More preferably, $R_2$ is selected from the group consisting of alkyl having up to about 18 carbon atoms, phenyl, and mixtures thereof. Particularly preferred is where $R_2$ is selected from the group consisting of methyl, ethyl, phenyl, and mixtures thereof.

$R_3$ is an amine radical, e.g., primary, secondary, and tertiary amines as well as diamines. Preferably, $R_3$ is selected from the group consisting of alkylamines, alkyldiamines and mixtures thereof. More preferably, $R_3$ is selected from the group consisting of alkylamines having up to about 8 carbon atoms, alkyldiamines having up to about 16 carbon atoms, and mixtures thereof. Such compositions are described in U.S. Pat. No. 3,508,933 issued Apr. 28, 1970; U.S. Pat. No. 3,836,371 issued Sep. 17, 1974; and in U.S. Pat. No. 3,890,271 issued Jun. 17, 1975. In accordance with the most preferred embodiment, an aminofunctional silicone marketed under the trademark Silicone KFB74.

The amount of aminofunctional polysiloxane incorporated in the protectant composition can vary. Generally, however, at least about 0.1 percent is usually necessary to obtain reasonable water displacement and beading performance. It is preferred to use up to about 10 percent with from about 0.1 to about 5 percent being more preferred. In accordance with the most preferred embodiments, about 1 percent of the aminofunctional silicone fluid is incorporated in the protectant composition.

Organopolysiloxanes useful in the present composition are those compounds having the general formula:

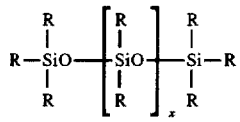

wherein the R's may be the same or different and can be alkyl radicals, e.g. methyl, ethyl, propyl, butyl, octyl, dodecyl, and octadecyl, aryl radicals, e.g., phenyl, diphenyl, and naphthyl radicals, alkenyl radicals, e.g., vinyl and alkyl radicals, cycloalkyl radicals, e.g., cyclobutyl, cyclopentyl, and cyclohexyl, alkaryl radicals, e.g., tolyl, xylyl, ethylphenyl, aralkyl radicals, e.g., alpha phenylethyl, and x has a numerical value from 200 to about 800, providing a viscosity of 8,000 to 12,000 cst and preferably about 10,000 cst.

Those polysiloxanes where R is selected from the group consisting of aryl, those alkyl radicals having up to about 30 carbon atoms, and mixtures thereof are preferred, especially those where the polysiloxane is tri-methyl end capped. The polysiloxanes where R is selected from the group consisting of phenyl, those alkyl radicals having up to 15 carbon atoms, and mixtures thereof are more preferred.

As noted above, the protectant composition of the present invention may contain one or more organopolysiloxanes. In the preferred embodiment organopolysiloxanes are included in the composition to provide consumer desired characteristics. In particular, a viscosity (i.e., greater than about 350 CST) organopolysiloxanes can be included to provide some leveling and drag reducing attributes to the composition. Accordingly, the present composition preferably includes one or more organopolysiloxane fluids to provide these attributes.

The amount and type of organopolysiloxane fluid useful in the present invention will depend upon the desired characteristics sought for the protectant composition and the compatibility with the other ingredients of the composition. The amount of organopolysiloxane included in the present invention, however, must not be so great that the other desired attributes of water displacement and beading are detrimentally affected.

Accordingly, where the organopolysiloxane fluid is included it can be included in the protectant composition in amounts from about 1 to about 20 percent. Preferably, the organopolysiloxanes is included in an amount from about 1 to 10 percent, more preferably from about 1 to 5 percent. In accordance with the most preferred embodiment, the organopolysiloxane fluid is included in an amount of about 10 percent polydimethylsiloxane having a viscosity of about 10,000 cst.

The film forming fluorine containing polymers are selected from fluoroacrylic polymers, fluoroalkyl polymers, fluoroamide, fluorosilicone polymers, polytetrafluorethylene (and mixtures thereof). The most preferred film forming polymers are the fluoramide polymers marketed under the tradename DYNAX 4310 by the Dynax Corporation and by Montefluos under the trademark GALDEN. This fluoroamide polymer has a melting point of about 109°–130° F.; a refractive index of about 1.35–1.43 at 120° F. and a specific gravity of about 1.158–1.70 g/ml.

The fluoroalkyl polymer emulsion, FC-214–30 is available from Minnesota Mining and Manufacturing Company, St. Paul, Minn.

The film forming fluoride containing polymer may be admixed in the compositions of this invention in an amount from about 0.1 to 10 weight percent. A preferred range is from about 0.1 to 1 weight percent and a most preferred range is 0.1 to 0.5 weight percent.

Solvents suitable for use in the formulation of the present invention are chosen to be sufficiently volatile to bring about effective drying after the composition has been applied to a substrate surface and not so volatile as to prematurely dry before the desired area of the substrate is covered. In this regard, it is preferred to utilize certain relatively high boiling point solvents so the protective composition is in contact with the surface for the reasons stated above and to reduce the flammability of the composition. In addition, the solvent should be capable of removing solvent soluble residues from the substrate surface.

Accordingly, certain solvents are deemed particularly useful in formulating the surface protectant composition, these include conventional hydrocarbon solvents such as hexane, heptane, VM & P naphtha, Stoddard solvents, naphtha, mineral spirits, kerosene and water. Isoparaffinic hydrocarbon solvents are highly preferred because they are essentially odor free. Suitable examples are the commercially available isoparaffinic hydrocarbon solvents under the trademark ISOPAR marketed by the Exxon Chemical Company, Houston, Tex. and those sold under the tradename NORPAR 13.

The hydrocarbon solvent may be contained in the composition of this invention in an amount of from about 10 to 70 weight percent of the composition (excluding any propellants). A preferred range is 20 to 50 weight percent and most preferred range is 25 to 35 weight percent.

As mentioned hereinbefore the surface protectant composition are preferably in the form of an emulsion. All emulsions comprise a continuous phase and a discontinuous phase. While the amount of surfactant present in the emulsion compositions of the present invention is not critical, an effective amount of surfactant or combinations of surfactants for dispersing the discontinuous phase throughout the continuous phase.

Nonionic surfactants, mixtures of nonionic surfactants and mixtures of nonionic and anionic surfactants can be utilized according to this invention. Examples of suitable nonionic surfactants include SPAN® and TWEEN® brand both available from ICI America, Inc., Wilmington, Del. which are sorbitan esters of oleic and lauric acids which are polyethoxylated having up to 20 ethoxy units. A specific example is SPAN 80 which is sorbitan monooleate. Other nonionic surfactants include ethoxylated nonylphenols tradename sulfonic N available from Jefferson Chemical, the ethoxylated octophenols available under the trademark TRITON® marketed by Rohm and Haas, Philadelphia, Pa.; the ethoxylated secondary alcohols TERGITOL® produced by Union Carbide, Danbury, Conn.; the ethoxylated primary alcohols marketed under the tradename NEODOLS® manufactured by Shell Chemical, Houston, Tex.; and the polymeric ethylene oxides tradename PLURONICS® from BASF Wyandotte.

Anionic surfactants which can be mixed with the nonionic surfactants described above include sodium lauryl sulfate, sodium alkyl ether sulfate, sulfosuccinates containing pendant polyethylene glycol moieties, and alkyl aryl sulfonates. Mixtures of these anionic surfactants can also be utilized according to this invention.

The surfactant component may range in amounts ranging from 0 to 10 based on the total weight of the surface protectant composition. A preferred range is from a about 0.1 to 3 weight percent and a most preferred range is from about 0.1 to 1 weight percent. It is preferred that the amounts of surfactant be minimized so as not to cause any detrimental effects to the protectant composition. It is to be noted that the organopolysilioxane component of the present invention functions as a surfactant.

Other conventional additives including but not limited to fragrances and preservatives such as formaldehyde or glutaraldehyde may be added to the coating compositions of this invention. For example, abrasives can be used in the polish formulations of this invention to remove road film and oxidized paint. The abrasive, however, must be made of fine particles (i.e. less than 10 microns) to avoid scratching and reducing the luster of the painted surface. Representative of suitable abrasives useful in the present formulations include alumina, aluminum silicate, boron carbide, chromium oxide, diatomaceous, earth, iron oxide, silica, silicone carbide and synthetic diamond. The content of this abrasive material in the finishing agent is preferably 1–10 weight percent of the total composition weight.

In paste formulations thickening agents such as soya, lecithin methyl cellulose and carboxyl methyl cellulose may be added in an amount necessary to achieve the desired consisting of the final surface protectant composition. Such techniques are well known to those skilled in the art and hence are only mentioned to the above for the sake of brevity.

The composition can be prepared by thoroughly mixing with a slight agitation each of the components. Preferably, the composition is prepared by the following steps: charge the desired amount of solvent and the organopolysiloxane fluid (or if more than one, add each) to the mixer vessel with slight agitation, then add the cross-linkable silicone compound to the mixing vessel with slight agitation, then add a desired amount of water and surfactant followed by the addition of the fluorinated polymer with each of the components at the concentration levels also described above. For example, in this more preferred embodiment, the surface protectant composition comprising about 1 to 15 percent of the paraffinic solvent from about 1 to about 10 percent of a cross-linkable silicone compound, from about 1 to about 20 percent organopolysilicone compound, from about 1 to about 15 percent micronized wax, from about 0.1 to about 1 percent film forming fluorine containing polymer, from about 0.1 to about 1 percent surfactant and from about 30 to about 90 percent water. The amount of surfactant should not exceed these stated limit so as not to negate the benefits of the invention.

The composition of the present invention can be placed effectively on many different surfaces to provide water- and oil-repellency and to impart a gloss having improved depth-of-gloss values. For example, it can be used effectively on the painted body of an automobile. It is also understood, however, that the protectant composition is also effective when applied to rubber, plastic and other surfaces. Preferably, the composition can be applied to the surface to be treated by use of a spray on an aerosol. More preferably with a non-polar aerosol, by a pump spray, or by wetting a sponge or cloth and applying the composition loaded sponge or cloth to the surface of course other means of application are contemplated. Preferably, as the porosity of the surface increases, it is desirable to apply the composition directly to the surface using a spray or aerosol. On the other hand, where the surface is relatively non-porous, such as a painted automobile surface, it is desirable to apply the protectant composition first to an applicator such as a sponge, cloth and the like and then apply the treated applicator to the surface. The protectant composition dries to provide a water- and oil-repellant coating having a glossy appearance without buffing.

In order to more clearly illustrate this invention, preferred modes of carrying it into effect and the advantageous results to be obtained thereby, the following examples are given in which the amounts and proportions are by weight except where significantly indicated otherwise.

EXAMPLE 1

An automobile surface protectant composition can be prepared by admixing by weight:

a) 15 percent isoparaffinic hydrocarbon solvent;
b) 6 percent of at least one wax in the form of micronized particles having an average diameter of from about 2 to 45 microns;
c) 3 percent of an aminofunctional silicone;
d) 1 percent of a dimethyl polysiloxane having a viscosity of 10,000 cst;
e) 0.5 percent of a nonionic surfactant;
f) 0.2 percent of a fluoroamide polymer; and
h) and the remainder water.

If desired,

EXAMPLE II

The following components were admixed as described above:

| Micronized Polymer Wax A222 | 6.00 |
| Aminofunctional Silicone KF874 | 3.00 |
| DC 200 Fluid, 10000 cst | 1.00 |
| Norpar 13 Paraffinic Solvent | 15.00 |
| Dynax 4310 | 0.20 |
| Span 80 | 0.50 |
| Water, Deionized | 74.30 |
| | 100.00 |

Initial Viscosity

Brookfield LVT #4 @ 12 RPM: 32,500 cps

The above surface protectant formulation was applied to block painted surface of an automobile panel with the following results:

| Rubout/drying time | Acceptable |
| Film thickness | Acceptable |
| Gloss properties | Very Good |
| Water beading of the film | Excellent |

The finish resulting from the formulation was more aesthetic due to the darker deeper and richer appearance due to the depth-in-gloss characteristic of the composition.

In lieu of DYNAX 4310, a fluoroacrylic polymer may be utilized.

The compositions can be used in aerosol form.

What is claimed is:

1. A surface protective composition comprising in admixture by weight:

a) from about 10 to about 170 percent of a hydrocarbon solvent selected from the group consisting of isoparaffinic, mineral spirits, hexane, heptane and naphtha;
b) from 0 to about 10 percent of a micronized wax;
c) from about 1 to about 10 percent of a crosslinkable silicone compound;
d) from about 1 to about 20 percent of an organopolysiloxane compound;
e) from about 0.1 to about 5 percent of a film forming fluorine containing polymer selected from the group consisting of fluoroacrylic polymers, fluoroalkyl polymers, fluoroamide polymers, fluorosilicone polymers, tetrafluoroethylene and mixtures thereof;
f) from about 0.1 to about 1 percent of a nonionic surfactant or a mixture of nonionic surfactants and anionic surfactants; and
g) water.

2. The composition of claim 1 wherein the film forming fluorine containing polymer is a fluoramide polymer.

3. The composition of claim 1 wherein said micronized wax has particles having an average diameter of from about 2 to about 45 microns.

4. The composition of claim 1 wherein said crosslinkable silicone compound is an aminofunctional siloxane of the general formula:

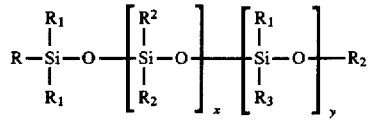

in which $R_1$ is an oxy radical, $R_2$ is selected from the group consisting of alkyl and aryl, $R_3$ is selected from the group consisting of an alkylamine radical, an alkyldiamine radical, and mixtures thereof and x+y ranges from 2 to 20.

5. The composition of claim 1 wherein the organopolysiloxane is a polysiloxane of the general formula:

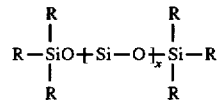

wherein R is selected from the group consisting of alkyl having up to about 30 carbon atoms, phenyl and mixtures thereof, and x is from about 40 to about and said polysiloxane has a viscosity in the range of 50 to 10,000 cst at 25° C.

6. The composition of claim 5 wherein said polysiloxane is a polydimethyl polysiloxane.

7. The composition of claim 1 including an abrasive.

8. An automobile surface protectant composition comprising in admixture by weight:

a) from about 10 to about 20 percent of an isoparaffinic solvent;
b) from about 1 to about 10 percent of a micronized wax;
c) from about 1 to about 10 percent of a crosslinkable silicone compound;
d) from about 1 to about 20 percent of an organopolysiloxane;
e) from about 0.1 to about 5 percent of a film forming fluorine containing polymer is selected from the group consisting of fluoroacrylic polymers, fluoroalkyl polymers, fluoroamide polymers, fluorosilicone polymers, tetrafluoroethylene and mixtures thereof;
f) from about 0.1 to about 1 percent of a nonionic surfactant or a mixture of nonionic and anionic surfactants; and
g) water.

* * * * *